June 1, 1954 R. S. BREWER 2,679,961
SPARE TIRE LOCK
Filed Aug. 24, 1953 2 Sheets-Sheet 1
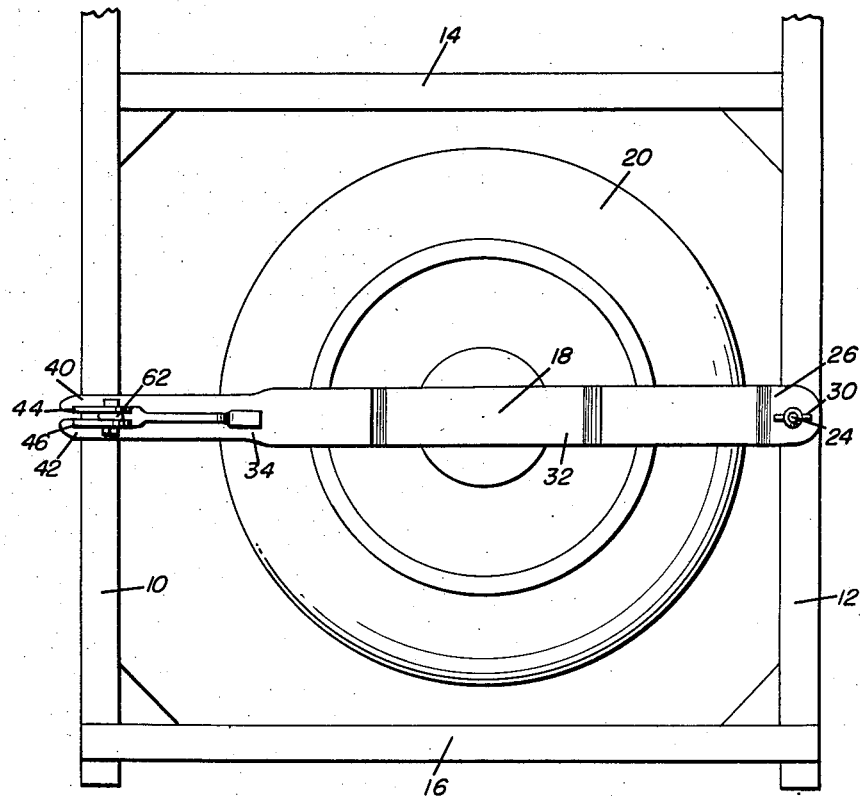
Fig. 1
Fig. 5
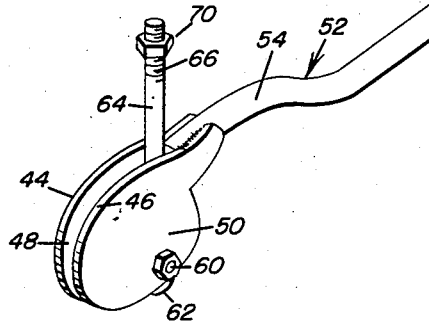
Richard S. Brewer
INVENTOR.

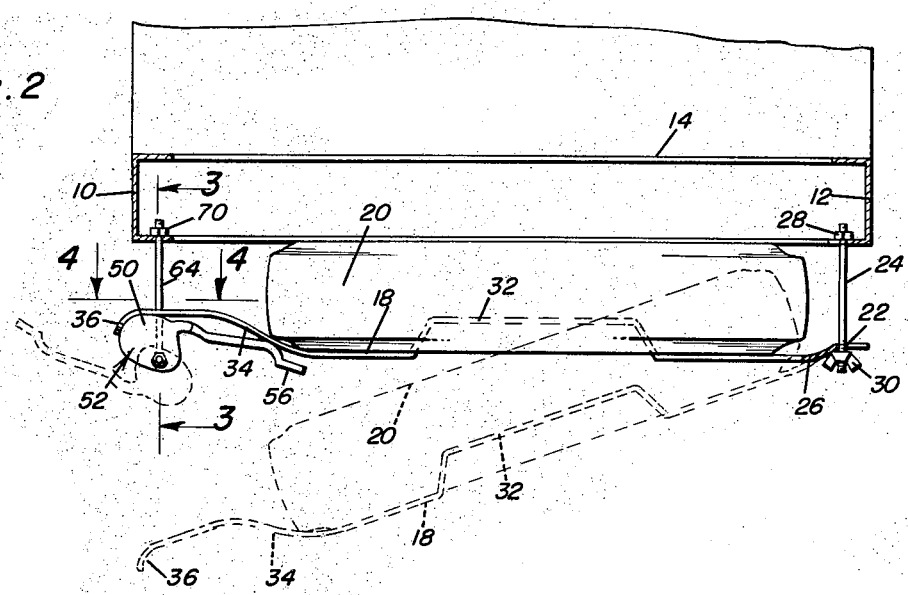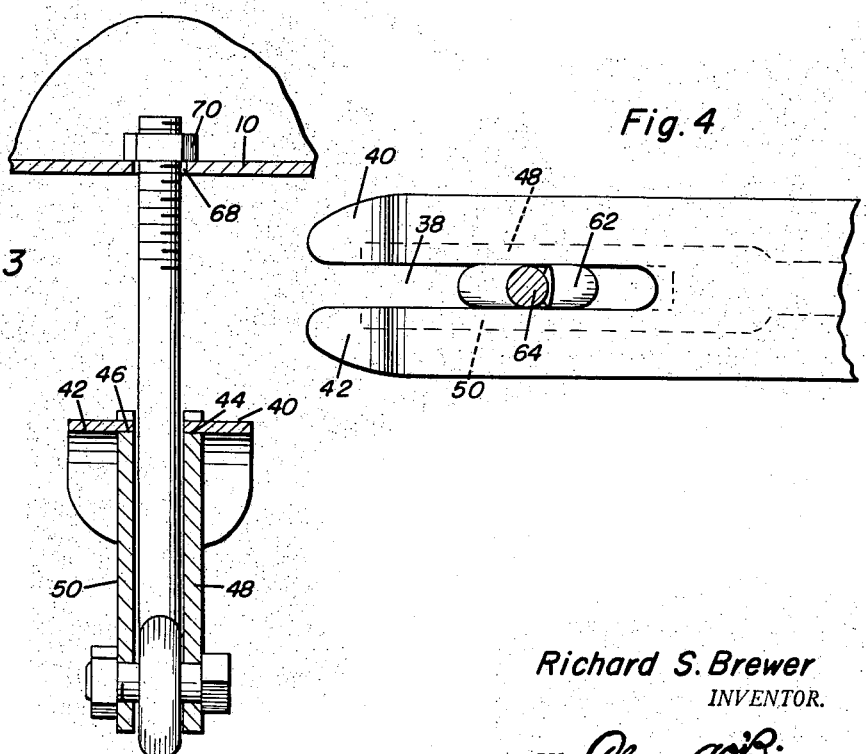
Richard S. Brewer
INVENTOR.

Patented June 1, 1954

2,679,961

UNITED STATES PATENT OFFICE 2,679,961

SPARE TIRE LOCK

Richard S. Brewer, Mountain View, Ark.

Application August 24, 1953, Serial No. 375,910

8 Claims. (Cl. 224—42.22)

This invention relates to means for supporting and securing a spare wheel and tire assembly beneath the frame of a motor vehicle such as a conventional truck.

The primary object of the present invention resides in the provision of means for easily and securely retaining a spare wheel and tire assembly in position beneath the frame of a truck utilizing means for quickly and conveniently permitting the spare wheel and tire assembly to be removed from its secured position for such use as may be necessary.

The construction of this invention features a strap having an upwardly extending central portion on which the spare wheel and tire assembly is adapted to seat, the strap having a bifurcated, arcuate free end adapted to overlie the cam locking member rotatably supported below the frame of the vehicle. Utilizing the cam locking member the strap will by its novel engagement therewith prevent the disengagement of the cam by unintentional means since the combined weight of the strap and spare wheel and tire assembly will prevent the cam locking member from becoming disengaged with the strap.

Still further objects and features of this invention reside in the provision of a spare wheel and tire assembly supporting a locking means that is strong and durable, simple in construction and manufacture, and capable of being readily installed in lieu of conventional and existing devices, and which is relatively inexpensive to produce.

These, together with the various ancillary objects and features of the invention which will become apparent as the following description proceeds, are attained by novel combination of elements, a preferred embodiment of which has been illustrated in the accompanying drawings, by way of example only, wherein:

Figure 1 is a bottom plan view of the spare tire supporting and locking means comprising the present invention;

Figure 2 is a vertical, sectional view illustrating in solid lines the relation of parts of the invention when the spare wheel and tire assembly is in a supported position and further illustrating by means of dotted lines the disengaged position of the various elements of the invention;

Figure 3 is an enlarged vertical, sectional view as taken along the plane of line 3—3 in Figure 2 illustrating the construction of the cam locking member and the bifurcated arcuate free end of the strap;

Figure 4 is a sectional detail view as taken along the plane of line 4—4 in Figure 2, which is illustrated in an enlarged scale by greater clarity and which fully illustrates the manner in which the free end of the strap is bifurcated; and Figure 5 is a perspective view of the cam locking member comprising one of the important elements of the invention.

With continuing reference to the accompanying drawings wherein like reference numerals designate similar parts throughout the various views, reference numerals 10 and 12 designate the longitudinal frame members of a vehicle which are joined by cross members 14 and 16, the member 16 being generally located at the rear of the vehicle.

In conjunction with the frame members 10 and 12 and the cross members 14 and 16, there is associated therewith a strap 18 which is adapted to support a spare wheel and tire assembly 20 beneath the frame of the vehicle. The strap 18 has a suitable aperture therethrough as at 22 through which a threaded rod 24 extends. The end 26 of the strap 18 is arcuately upwardly curved. The back of the support is adjustably positioned relative to the frame member 12 by means of a nut 28 and the lower threaded end of the rod 24 is adjusted relative to the end 26 of the strap 18 by means of a winged nut 30. In this manner the end 26 of the strap 18 is lockingly adjustably positioned relative to the frame member 12.

The strap 18 has an upwardly offset central portion 32 of the shape which can be best seen in Figure 2 and about which the spare wheel and tire assembly 20 is adapted to seat. The upwardly offset portion 32 is received between the concavity formed about the rim of the spare wheel and tire assembly 20. Thus, the spare wheel and tire assembly 20 may be securely seated on the strap 18. The free end of the strap 18 is upwardly offset as at 34 and terminates in an arcuate lip 36 which is bifurcated by a slot 38 therethrough forming lip sections 40 and 42. The lip sections 40 and 42 are adapted to seat on the upper arcuate surfaces 44 and 46 of cam locking elements 48 and 50 forming part of the cam locking member 52.

The cam locking elements 48 and 50 have received therebetween as by welding a retaining arm 54 provided with a handle portion 56 and a stepped arcuate engaging surface 58 which is adapted to abut against the upwardly extending portion 34 of the strap 18. The cam locking elements 48 and 50 are held in spaced relationship by their novel arrangement with the retaining arm 54 and in addition there is provided a shaft 60 which extends therebetween and which extends through an eye portion 62 formed at the lower free end of an attaching rod 64 which has a threaded upper end 66 freely received through an aperture 68 in the frame member 10. The rod 64 is adjustably held in desired position by a nut 70. It is to be noted that the rod 64 is free to be somewhat pivoted relative to the main member 10. It is to be noted that when the bifurcated portions 40 and 42 are received on the arcuately shaped cam element surfaces 44 and 46 the rod 64 extends upwardly through the slot 38.

The operation of this device will be readily understood by an inspection of Figure 2. With the spare wheel and tire assembly 20 in an upwardly supported position, the bifurcated portions 40 and 42 of the strap 18 press downwardly upon the essentially offset cam elements 48 and 50 so that the retaining surface 58 of the retaining arm 54 engages the strap 18 to cause the weight of the strap 18 and the spare wheel and tire assembly 20 to prevent disengagement of the cam locking element 52 and the strap 18 since the cam locking element 52 can only be rotated against the force of gravity applied thereon by the strap 18 and the spare wheel and tire assembly 20. It is noted that the cam locking element 52 and the rod 64 are prevented from peripheral movement relative to the frame member 10 by the arcuate lips 40 and 42 of the bifurcated portions of the strap 18. However, using the handle portion 56 of the cam retaining elements 52 the cam locking elements 52 may be forcibly rotated and then subsequently pivoted out of engagement with the bifurcated end portions 40 and 42 of the strap 18. This will permit the strap 18 to be pivoted about the rod 24 thereby permitting ready access to the spare wheel and tire assembly 20.

Since from the foregoing the construction and advantages of the wheel and tire assembly mounting means will be readily understood, further explanation is believed to be unnecessary.

However, since numerous modifications will readily occur to those skilled in the art, after consideration of the foregoing specification and accompanying drawings, it is not intended to limit the invention to the exact embodiments shown and described, and accordingly all suitable modifications and equivalents may be resorted to.

What is claimed as new is as follows:

1. A device of the class described for use in lockingly supporting a spare wheel and tire assembly on a motor vehicle comprising in combination with the frame of the vehicle, an elongated strap, means adjustably securing one of the ends of said strap to said frame, the free end of said strap being of arcuate bifurcated shape, a cam locking member, a rod adjustably securing said cam locking member to said frame, said free end of said strap being engageable over said cam locking member.

2. A device of the class described for use in lockingly supporting a spare wheel and tire assembly on a motor vehicle comprising in combination with the frame of the vehicle, an elongated strap, means adjustably securing one of the ends of said strap to said frame, the free end of said strap being of an arcuate bifurcated shape, a cam locking member, a rod adjustably securing said cam locking member to said frame, said free end of said strap being engageable over said cam locking member, said cam locking member including a pair of spaced cam elements, a shaft extending between said cam elements, said rod having one end provided with an eye portion, said shaft extending through said eye portion rotatably mounting said cam locking member on said rod.

3. A device of the class described for use in lockingly supporting a spare wheel and tire assembly on a motor vehicle comprising in combination with the frame of the vehicle, an elongated strap, means adjustably securing one of the ends of said strap to said frame, the free end of said strap being of arcuate bifurcated shape, a cam locking member, a rod adjustably securing said cam locking member to said frame, said free end of said strap being engageable over said cam locking member, said cam locking member including a retaining arm engageable with said strap to lockingly hold said strap in a spare wheel and tire assembly supporting position.

4. A device of the class described for use in lockingly supporting a spare wheel and tire assembly on a motor vehicle comprising in combination with the frame of the vehicle, an elongated strap, means adjustably securing one of the ends of said strap to said frame, the free end of said strap being of an arcuate bifurcated shape, a cam locking member, a rod adjustably securing said cam locking member to said frame, said free end of said strap being engageable over said cam locking member, said cam locking member including a pair of spaced cam elements, a shaft extending between said cam elements, said rod having one end provided with an eye portion, said shaft extending through said eye portion rotatably mounting said cam locking member on said rod, said cam locking member including a retaining arm engageable with said strap to lockingly hold said strap in a spare wheel and tire assembly supporting position.

5. A device of the class described for use in lockingly supporting a spare wheel and tire assembly on a motor vehicle comprising in combination with the frame of the vehicle, an elongated strap, means adjustably securing one of the ends of said strap to said frame, the free end of said strap being of an arcuate bifurcated shape, a cam locking member, a rod adjustably securing said cam locking member to said frame, said free end of said strap being engageable over said cam locking member, said cam locking member including a pair of spaced cam elements, a shaft extending between said cam elements, said rod having one end provided with an eye portion, said shaft extending through said eye portion rotatably mounting said cam locking member on said rod, said cam locking member including a retaining arm engageable with said strap to lockingly hold said strap in a spare wheel and tire assembly supporting position, said retaining arm being secured between said cam elements.

6. A device of the class described for use in lockingly supporting a spare wheel and tire assembly on a motor vehicle comprising in combination with the frame of the vehicle, an elongated strap, means adjustably securing one of the ends of said strap to said frame, the free end of said strap being of an arcuate bifurcated shape, a cam locking member, a rod adjustably securing said cam locking member to said frame, said free end of said strap being engageable over said cam locking member, said cam locking member including a pair of spaced cam elements, a shaft extending between said cam elements, said rod having one end provided with an eye portion, said shaft extending through said eye portion rotatably mounting said cam locking member on said rod, the bifurcated portions of said free end of said strap overlying the upper portions of said cam elements with said rod being received between said bifurcated portions.

7. A device of the class described for use in lockingly supporting a spare wheel and tire assembly on a motor vehicle comprising in combination with the frame of the vehicle, an elongated strap, means adjustably securing one of the ends of said strap to said frame, the free end of said strap being of an arcuate bifurcated shape, a cam locking member, a rod adjustably securing said cam locking member to said frame, said free end of said strap being engageable over said cam locking member, said cam locking member including a pair of spaced cam elements, a shaft extending between said cam elements, said rod having one end provided with an eye portion, said shaft extending through said eye portion rotatably mounting said cam locking member on said rod, said cam locking member including a retaining arm engageable with said strap to lockingly hold said strap in a spare wheel and tire assembly supporting position, said retaining arm being secured between said cam elements, the bifurcated portions of said free ends of said strap overlying the upper portions of said cam elements with said rod being received between said bifurcated portions.

8. A device of the class described for use in lockingly supporting a spare wheel and tire assembly on a motor vehicle comprising in combination with the frame of the vehicle, an elongated strap, means adjustably securing one of the ends of said strap to said frame, the free end of said strap being of arcuate bifurcated shape, a cam locking member, a rod adjustably securing said cam locking member to said frame, said free end of said strap being engageable over said cam locking member, said strap having an upwardly offset center portion on which said wheel and tire assembly is adapted to seat.

References Cited in the file of this patent

UNITED STATES PATENTS

| Number | Name | Date |
|---|---|---|
| 1,641,890 | Jackson | Sept. 6, 1927 |
| 1,672,356 | Wasserfallen | June 5, 1928 |
| 1,913,835 | Golike | June 13, 1933 |
| 2,449,544 | Ballard | Sept. 21, 1948 |
| 2,645,394 | Bord | July 14, 1953 |